No. 865,811. PATENTED SEPT. 10, 1907.
W. H. POWELL.
SYSTEM OF MOTOR CONTROL.
APPLICATION FILED APR. 16, 1906.
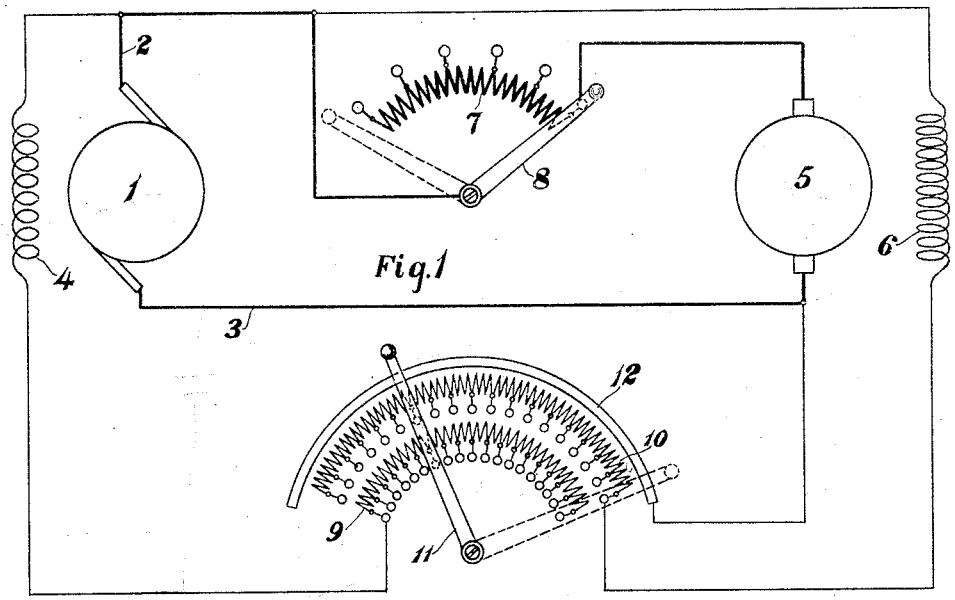
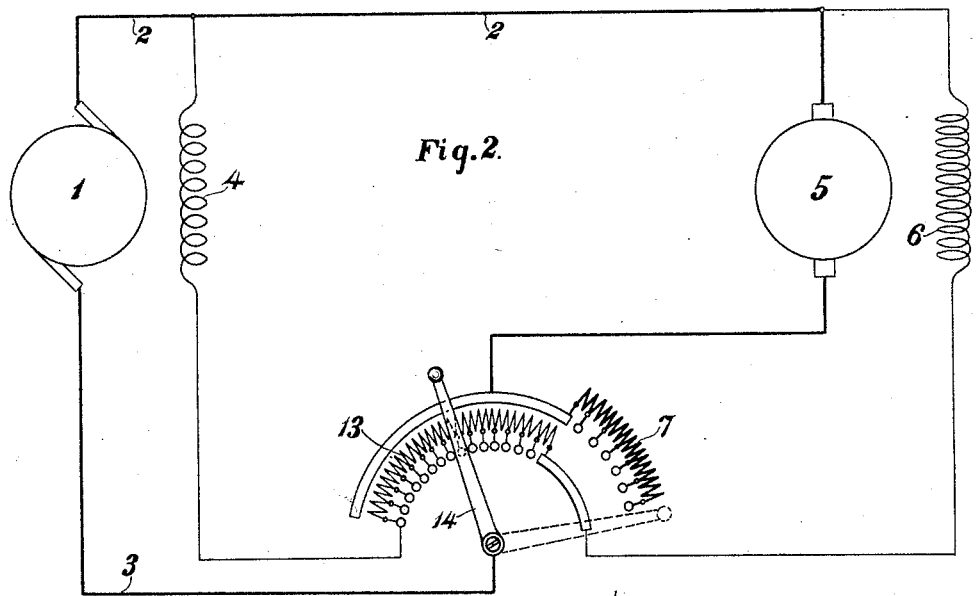
WITNESSES
INVENTOR
William H. Powell
By
Chas. E. Lord
ATTORNEY

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 865,811.      Specification of Letters Patent.      Patented Sept. 10, 1907.

Application filed April 16, 1906. Serial No. 311,828.

*To all whom it may concern:*

Be it known that I, WILLIAM H. POWELL, a citizen of the United States, residing at Norwood, in the county of Hamilton and State of Ohio, have invented certain new and useful Improvements in Systems of Motor Control, of which the following is a full, clear, and exact specification.

My invention relates to motor control systems and especially to control systems for motors requiring great variations in speed in a minimum time.

The object of my invention is to enable the speed of a motor to be rapidly varied, with minimum loss of energy. Heretofore it has been proposed to have the motor armature supplied by a special generator armature, the motor field being constant and the generator field varied in accordance with the speed desired. This necessitates a motor and a generator of a very much larger capacity than required by the load, for the maximum voltage and maximum current supplied by the generator to the motor are not used simultaneously, but rather the maximum voltage is used with a comparatively small current, and the maximum current with a comparatively small voltage.

With my invention, the generator and the motor are not required to be of much, if any, greater capacity than required by the load, for the maximum current and maximum voltage are used simultaneously or nearly so. That is when the current is a maximum, the voltage is at least near the maximum, and vice versa.

Another sometimes disadvantageous feature of the prior arrangement before referred to is that the field of the motor at least, and usually the field of the generator must be separately excited. With my arrangement both of these fields as well as the motor armature are excited by the generator.

In one aspect my invention comprises the method of controlling the speed of an electric motor, which consists in supplying the motor with current from a generator, and inversely varying the field strength of the motor and the electromotive force of the generator in alternate steps.

In a more specific aspect my invention comprises the method of regulating the speed of an electric motor, consisting in mechanically generating electrical energy, supplying this energy to the motor armature and to the field coils of both generator and motor, and inversely varying in alternate steps the current strengths in the field coils of the generator and the motor.

In another aspect my invention consists of the combination of a generator, a motor supplied thereby and means for inversely varying the field strengths of the motor and generator in alternate steps.

More specifically considered my invention consists of the combination of a dynamo-electric generator, a motor whose field and armature windings are both supplied by said generator, and means for inversely varying the electromotive force of said generator and the field strength of said motor alternately step by step.

In a still more specific aspect, my invention consists of a motor control system comprising a self-excited generator, a motor whose field and armatures are both supplied thereby, and a rheostat so connected and arranged that during part of its movement it controls resistance in the motor armature circuit, and during the remainder of its movement, it controls resistance in the field circuits of both the generator and the motor.

Other features of my invention will appear in the following description and accompanying drawings, and will be more particularly pointed out in the appended claims.

Figure 1 is a diagram showing my invention with separate starting and regulating rheostats. Fig. 2 is a similar diagram showing all the rheostats under the control of a single handle.

The generator 1 is driven by any suitable means, and supplies the mains 2 and 3. Between these mains are connected in multiple to each other the generator field winding 4, the motor armature 5, and the motor field winding 6. In each of these three circuits is included a variable resistance. The motor may be used to drive any desired load.

In Fig. 1 the motor armature circuit includes the variable resistance or starting rheostat 7, the resistance varying arm of which is shown at 8. In the generator and motor field circuits are the variable resistances 9 and 10 respectively, controlled by the single rheostat arm 11.

The contact ring 12 is connected to the main 3. The resistances 9 and 10 are so arranged that as the arm 11 is moved the resistances are inversely varied in alternate steps, the movement of arm 11 from one contact button to the next in the same series serving to vary the motor speed in two distinct steps, first by shunting a section of each resistance, thereby removing from its circuit that one of said sections which was previously in circuit, and second by opening said shunts, thereby inserting the other of said resistances into its circuit. By varying the relation of the width of the controller arm at the contacts, the width of the contacts themselves, and the space between adjacent contacts, the extent of movement of the controller arm may be made the same for each step, or the same for alternate steps while different for successive steps. The alternate variation of the resistances of the two field circuits makes the speed changes of the working motor twice as gradual as simultaneous variation would.

When the arm 8 is in its extreme left hand position, as shown in dotted lines, the motor armature circuit is broken. At this time the arm 11 is preferably in its extreme right hand position as also shown in dotted lines, so that the whole resistance 9 is in the generator field circuit, and none of the resistance 10 is in the motor field circuit. Thus the generator field is at its weakest and the motor field at its strongest. As the arm 8 is moved towards the right the motor armature circuit is completed and the resistance 7 then gradually cut out. After the arm 8 has reached its extreme right hand or full line position, it is preferably not again moved until the motor is to be stopped, for the resistance 7 is for starting purposes only. To increase the speed of the armature 5, the arm 11 is now moved to the left, thus gradually and in alternate steps cutting out resistance 9 and cutting in resistance 10. By the strengthening of the generator field due to the diminished resistance of the field circuit, the electromotive force of the generator is increased. This increases the electromotive force impressed on the motor armature 5, and the current through said armature, resulting in an increased speed of the motor. The weakening of the motor field due to the increased resistance of its field circuit causes a still further increase of speed of the motor.

The resistances of the parts 6 and 10 are so proportioned that the movement of arm 11 to the left decreases the current through the winding 6, although the difference of potential between the mains 2 and 3 is increased. In other words the ratio of resistance increase of the motor field circuit is greater than the ratio of voltage increase of the generator. A movement of the arm 11 towards the right causes a strengthening of the motor field and decrease of generator voltage, thus causing the motor to slow down.

In Fig. 2 all of the rheostats are combined so as to be controlled by one handle, and instead of two resistances 9 and 10, there is but one resistance 13 for both field circuits, the winding 4 being connected to one end of this resistance and the winding 6 to the other. Thus part of resistance 13 is in one field circuit, and the remainder of it in the other, the relation between the parts being determined by the position of the arm 14, which is connected to the main 3 and controls all the resistances. When the arm 14 is in its extreme right hand position as shown in dotted lines, the motor armature circuit is broken, the motor field is at its strongest and the generator field at its weakest, for the whole of resistance 13 is in the generator field circuit. As the arm 14 is moved to the left, the motor armature circuit is completed and the starting resistance 7 is gradually cut out. After the starting resistance 7 has been cut out, further movement of the arm 14 to the left causes a strengthening of the generator field and a weakening of the motor field in alternate steps, more or less of the resistance 13 being transferred from the generator field circuit to the motor field circuit and being temporarily short-circuited during the transfer. Thus a movement of arm 14 to the left causes an increase in the motor speed, and a movement to the right causes a corresponding decrease.

If desired, the arm 14 may be movable far enough to the right to break the field circuits of the generator and the motor, but, as shown, the contacts should be so arranged that these field circuits are broken after the motor armature circuit, and, when the arm is moved in the opposite direction, made before the motor armature circuit.

It is obvious that when the starting resistance is controlled by the same handle as the field resistance, it is not necessary to have resistance for the two field circuits combined, for in the rheostat arrangements of Fig. 2, the two resistances 9 and 10 of Fig. 1 might be substituted for the single resistance 13, the other parts remaining the same.

By the term "inversely" I do not wish to limit myself to exact "inverse proportion", but intend that the term should include any increase in one and decrease in the other of the two parts specified.

I have described my invention in what I now consider to be its preferred form, but many details of connection and arrangement can be varied without departing from the spirit of the invention. All such obvious modifications I consider to come within the scope of my invention.

What I claim as new, and desire to secure by Letters Patent is:—

1. The method of regulating the speed of an electric motor which consists in inversely varying in alternate steps its field strength and the electro-motive force impressed upon its armature.

2. The method of controlling the speed of an electric motor, which consists in supplying the motor with current from a generator, and inversely varying in alternate steps the field strength of the motor and the electro-motive force of the generator.

3. The method of regulating the speed of an electric motor, consisting in mechanically generating electrical energy, supplying the energy to the motor, and inversely varying the field strengths of the motor and the generator in alternate steps.

4. The method of operating an electric motor at varying speed, which consists in converting mechanical energy into electrical energy, supplying the electrical energy to the motor, and inversely varying alternately step by step the electro-motive force of the electrical energy and the field strength of the motor.

5. The method of varying the current through the armature of an electric motor, which consists in supplying the armature of the motor with current from a source of variable electro-motive force, and inversely varying in alternate steps the electro-motive force of said source and the field strength of the motor.

6. The method of controlling the speed of an electric motor, consisting in supplying the field and armature of the motor from a source of variable electromotive force, and inversely varying in alternate steps the electro-motive force of said source and the field strength of the motor.

7. The method of varying the speed of an electric motor, consisting in converting mechanical energy into electrical energy, supplying the electrical energy to both the field and armature of the motor, and inversely varying in alternate steps the electro-motive force of said electrical energy and the field strength of the motor.

8. The method of regulating the speed of an electric motor consisting in mechanically generating electrical energy, supplying this energy to the motor armature and to the field coils of both generator and motor, and inversely varying in alternate steps the current strengths in the field coils of the generator and the motor.

9. The method of regulating the speed of an electric motor, consisting in mechanically generating electrical energy, supplying this energy to the generator field coil and to the motor armature and field coil, and varying in alternate steps the field strengths of the generator and the motor.

10. The method of increasing the speed of an electric motor, which consists in supplying the motor with current from a generator, and increasing the electro-motive force of the generator and weakening the field of the motor in alternate steps.

11. The method of decreasing the speed of an electric motor, consisting in mechanically generating electrical energy, supplying the electrical energy to the motor, and diminishing the electro-motive force of the electrical energy and increasing the field strength of the motor in alternate steps.

12. A motor control system comprising a generator, a motor supplied thereby and means for inversely varying the field strengths of the motor and the generator in alternate steps.

13. A motor control system comprising a source of electricity, a motor supplied thereby, and means for inversely varying in alternate steps the field strength of the motor and the electro-motive force of the source of electricity.

14. A motor control system comprising a dynamo-electric generator, a motor supplied thereby, and means for inversely varying in alternate steps the electromotive force of the generator and the field strength of the motor.

15. A motor control system comprising a source of variable electromotive force, a motor armature supplied thereby, a field winding for the armature, and means for inversely varying in alternate steps the electromotive force of said source and the strength of current in said field winding.

16. A motor control system comprising a source of variable electromotive force, a motor armature and field winding supplied thereby, and means for inversely varying in alternate steps the electromotive force of said source and the field strength of said motor.

17. A motor control system comprising a dynamo-electric generator, a motor whose field and armature windings are both supplied by said generator, and means for inversely varying in alternate steps the electromotive force of said generator and the field strength of said motor.

18. A motor control system comprising a self-excited dynamo-electric generator, a motor whose field and armature windings are both supplied thereby, and means for inversely varying in alternate steps the current strengths in the field windings of the generator and the motor.

19. A motor control system comprising a self-excited dynamo-electric generator, a motor whose field and armature windings are both supplied thereby, and means for varying the field strengths of the generator and the motor in alternate steps.

20. A motor control system, comprising a source of electricity, a motor supplied thereby, and means for increasing the electromotive force of the source and weakening the field of the motor in alternate steps.

21. A motor control system comprising a dynamo-electric generator, a motor supplied thereby, and means for decreasing the electromotive force of the generator and increasing the field strength of the motor in alternate steps.

22. A motor control system, comprising a generator, a motor supplied thereby, variable resistances in the field circuits of the generator and the motor, and means for inversely varying said resistances in alternate steps.

23. A motor control system, comprising a generator, a motor supplied thereby, variable resistances in the field circuits of the generator and the motor, and a single arm for inversely varying said resistances in alternate steps.

24. A motor control system, comprising a generator, a motor supplied thereby, a starting resistance in the motor armature circuit, resistances in the field circuits of the generator and the motor, and means for inversely varying said field resistances in alternate steps.

25. A motor control system, comprising a generator, a motor supplied thereby, a starting resistance in the motor armature circuit, resistances in the field circuits of the generator and the motor, and a single arm for inversely varying said field resistances in alternate steps.

26. A motor control system, comprising a generator, a motor supplied thereby, a starting resistance in the motor armature circuit, resistances in the field circuits of the generator and the motor, and a single arm for inversely varying said field resistances in alternate steps and for cutting out said starting resistance.

27. A motor control system, comprising a self-excited generator, a motor whose field and armature circuits are both supplied thereby, variable resistances in the field circuits of the generator and the motor, and means for inversely varying said resistances in alternate steps.

28. A motor control system, comprising a self-exciting generator, a motor whose field and armature circuits are both supplied thereby, variable resistances in the field circuits of the generator and the motor, and a single arm for inversely varying said resistances in alternate steps.

29. A motor control system, comprising a self-excited generator, a motor whose field and armature circuits are both supplied thereby, a starting resistance in the motor armature circuit, resistances in the field circuits of the generator and the motor, and means for inversely varying said field resistances in alternate steps.

30. A motor control system comprising a self-excited generator, a motor whose field and armature circuits are both supplied thereby, a starting resistance in the motor armature circuit, resistances in the field circuits of the generator and the motor, and a single arm for varying said field resistances inversely.

31. A motor control system comprising a self-excited generator, a motor whose field and armature circuits are both supplied thereby, a starting resistance in the motor armature circuit, resistances in the field circuits of the generator and the motor, and a single arm for varying said field resistances inversely and for cutting out said starting resistance.

32. A motor control system comprising a generator, a motor supplied thereby, variable resistance in the field circuits of the generator and motor, and a single rheostat arm arranged to decrease the resistance in one field circuit and increase it in the other in alternate steps.

33. A motor control system comprising a self-excited generator, a motor whose field coil and armature are supplied thereby, variable resistance in the field circuits of the generator and the motor, and a single rheostat arm arranged to decrease the resistance in one field circuit and increase it in the other in alternate steps.

34. A motor control system, comprising a source of electricity, a motor supplied thereby, a starting resistance in the motor armature circuit, and a unitary means for cutting out said starting resistance, increasing the electromotive force of the source, and weakening the field of the motor.

35. A motor control system, comprising a source of electricity, a motor supplied thereby, a starting resistance in the motor armature circuit, and a single arm for first cutting out said starting resistance and then increasing the electromotive force of said source.

36. A motor control system comprising a self-excited generator, a motor whose field coil and armature are both supplied thereby, and a rheostat so connected and arranged that during part of its movement it controls resistance in the motor armature circuit, and during the remainder of its movement it controls resistance in the field circuits of both the generator and the motor.

37. A motor control system, comprising a generator, a motor supplied thereby, and a rheostat so connected and arranged that during one part of its movement it controls resistance in the motor armature circuit and during another part of its movement it controls resistance in the generator field circuit.

38. A motor control system comprising a self-excited generator, a motor whose field coil and armature are both supplied thereby, and a rheostat so connected and arranged that during part of its movement it controls resistance in the motor armature circuit and during the remainder of its movement it controls resistance in the generator field circuit.

39. A motor control system comprising a generator, a motor supplied thereby, and a rheostat so connected and arranged that during one part of its movement it controls resistance in the motor armature circuit, and during another part of its movement it controls resistance in the field circuits of both the generator and the motor.

40. A motor starting system, comprising a generator, a motor supplied thereby, and a starting rheostat connected and arranged to first remove resistance from the motor armature circuit and then remove resistance from the generator field circuit.

41. A motor starting system comprising a generator, a motor supplied thereby, and a starting rheostat connected and arranged to first remove resistance from the motor armature circuit and then in alternate steps remove resistance from the generator field circuit and insert resistance in the motor field circuit.

42. A motor control system comprising a self-excited generator, a motor whose field coil and armature are both supplied thereby, and a starting rheostat connected and arranged to first remove resistance from the motor armature circuit and then remove resistance from the generator field circuit.

43. A motor control system comprising a self-excited generator, a motor whose field coil and armature are both supplied thereby, and a starting rheostat connected and arranged to first remove resistance from the motor armature circuit and then in alternate steps remove resistance from the generator field circuit and insert resistance in the motor field circuit.

44. In combination, a generator, a motor, leads from the generator armature to one of which one terminal of the motor armature, the motor field winding, and the generator field winding are each connected, and a rheostat to one point of which the other generator lead is connected and to other points of which the other terminals of the motor armature, the motor field winding and the generator field winding respectively are connected.

45. In combination, a generator, a motor, leads from the generator armature, and a rheostat directly connected to one of the generator leads, and between which and the other lead, the motor armature, the motor field winding, and the generator field winding are connected.

46. In combination, a generator, a motor, leads from the generator armature, and a rheostat directly connected to one of the generator leads, and between which and the other lead, the motor armature, the motor field winding, and the generator field winding are connected in multiple.

47. In combination, a generator, a motor, leads from the generator armature, and a rheostat directly connected to one of the generator leads, and between which and the other lead, the motor armature, the motor field winding, and the generator field winding are connected, whereby the latter are all under the control of the rheostat.

48. In combination, a generator, a motor, leads from the generator armature, and a rheostat directly connected to one of the generator leads, and between which and the other lead, the motor armature, the motor field winding and the generator field winding are connected in multiple, whereby the current strengths through the latter are all varied by the rheostat so that movement of the rheostat arm in one direction increases the motor speed and in the other direction decreases said speed.

In testimony whereof I affix my signature, in the presence of two witnesses.

WILLIAM H. POWELL.

Witnesses:
GEO. B. SCHLEY,
FRED J. KINSEY.